United States Patent
Shepelev et al.

(10) Patent No.: US 10,719,159 B2
(45) Date of Patent: Jul. 21, 2020

(54) METHOD AND SYSTEM FOR FORCE SENSITIVE COMPONENTS IN A DISPLAY DEVICE

(71) Applicant: Synaptics Incorporated, San Jose, CA (US)

(72) Inventors: Petr Shepelev, San Jose, CA (US); Kurth Reynolds, San Jose, CA (US)

(73) Assignee: Synaptics Incorporated, San Jose, CA (US)

( * ) Notice: Subject to any disclaimer, the term of this patent is extended or adjusted under 35 U.S.C. 154(b) by 163 days.

(21) Appl. No.: 15/906,892

(22) Filed: Feb. 27, 2018

(65) Prior Publication Data

US 2018/0267660 A1    Sep. 20, 2018

Related U.S. Application Data

(60) Provisional application No. 62/473,166, filed on Mar. 17, 2017.

(51) Int. Cl.

| | |
|---|---|
| *G06F 3/041* | (2006.01) |
| *G06F 3/044* | (2006.01) |
| *G02F 1/1333* | (2006.01) |
| *G06F 3/0488* | (2013.01) |
| *G06F 3/0487* | (2013.01) |

(52) U.S. Cl.
CPC ........ *G06F 3/0414* (2013.01); *G02F 1/13338* (2013.01); *G06F 3/044* (2013.01); *G06F 3/0412* (2013.01); *G06F 3/0416* (2013.01); *G06F 3/0487* (2013.01); *G06F 3/0488* (2013.01); *G06F 2203/04105* (2013.01)

(58) Field of Classification Search
CPC ...... G06F 3/0414; G06F 3/0412; G06F 3/044; G06F 3/0488; G02F 1/13338
See application file for complete search history.

(56) References Cited

U.S. PATENT DOCUMENTS

| | | | | |
|---|---|---|---|---|
| 2012/0105081 A1* | 5/2012 | Shaikh | ................. | G06K 9/0002 324/686 |
| 2014/0232665 A1* | 8/2014 | Lee | ......................... | G06F 3/041 345/173 |
| 2014/0285466 A1* | 9/2014 | Hayashi | ................. | G06F 3/044 345/174 |
| 2015/0363019 A1* | 12/2015 | Schediwy | ............... | G06F 3/044 345/174 |

\* cited by examiner

*Primary Examiner* — Wing H Chow
(74) *Attorney, Agent, or Firm* — Ferguson Braswell Fraser Kubasta PC

(57) ABSTRACT

A processing system includes a sensor module and a determination module. The sensor module is configured to perform a capacitive scan using electrodes disposed in a display device in a first area. The determination module is configured to determine, using the capacitive scan, a bending response of an input surface covering the first area and a second area. The bending response results from an input force being applied to the input surface in the second area. The determination module is further configured to determine, using the bending response, a force estimate of the input force, and determine, based on the force estimate, whether to perform an interface action.

20 Claims, 8 Drawing Sheets

METHOD AND SYSTEM FOR FORCE SENSITIVE COMPONENTS IN A DISPLAY DEVICE

CROSS-REFERENCE TO RELATED APPLICATIONS

This application claims priority to U.S. Provisional Patent Application Ser. No. 62/473,166, titled "FORCE SENSITIVE BUTTONS UNDER AN INPUT SURFACE SHARED WITH A DISPLAY", which was filed on Mar. 17, 2017, and is incorporated herein by reference.

FIELD

This disclosed technology generally relates to electronic devices.

BACKGROUND

Input devices, including proximity sensor devices (also commonly called touchpads or touch sensor devices), are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones). Moreover, many input devices incorporate force sensing features in addition to proximity sensing.

In general, in one aspect, one or more embodiments relate to a processing system. The processing system includes a sensor module, the sensor module configured to perform a capacitive scan using a plurality of electrodes disposed in a display device in a first area. The processing system further includes a determination module that is configured to determine, using the capacitive scan, a bending response of an input surface covering the first area and a second area. The bending response results from an input force being applied to the input surface in the second area. The processing system is further configured to determine, using the bending response, a force estimate of the input force, and determine, based on the force estimate, whether to perform an interface action.

In general, in one aspect, one or more embodiments relate to an electronic system. The electronic system includes a display device including a plurality of electrodes disposed in the display device in a first area, an input surface covering the first area and a second area, and a processing system operatively connected to the display device. The processing system is configured to perform a capacitive scan using the plurality of electrodes, and determine, using the capacitive scan, a bending response of the input surface. The bending response results from an input force being applied to the input surface in the second area. The processing system is further configured to determine, using the bending response, a force estimate of the input force, and determine, based on the force estimate, whether to perform an interface action.

In general, in one aspect, one or more embodiments relate to a method. The method includes performing a capacitive scan using a plurality of electrodes disposed within a display device in a first area. The method further includes determining, using the capacitive scan, a bending response of an input surface covering the first area and a second area. The bending response results from an input force being applied to the input surface in the second area. In addition, the method includes determining, using the bending response, a force estimate of the input force, and determining, based on the force estimate, whether to perform an interface action.

Other aspects of the disclosed technology will be apparent from the following description and the appended claims.

DETAILED DESCRIPTION

Figure 1:
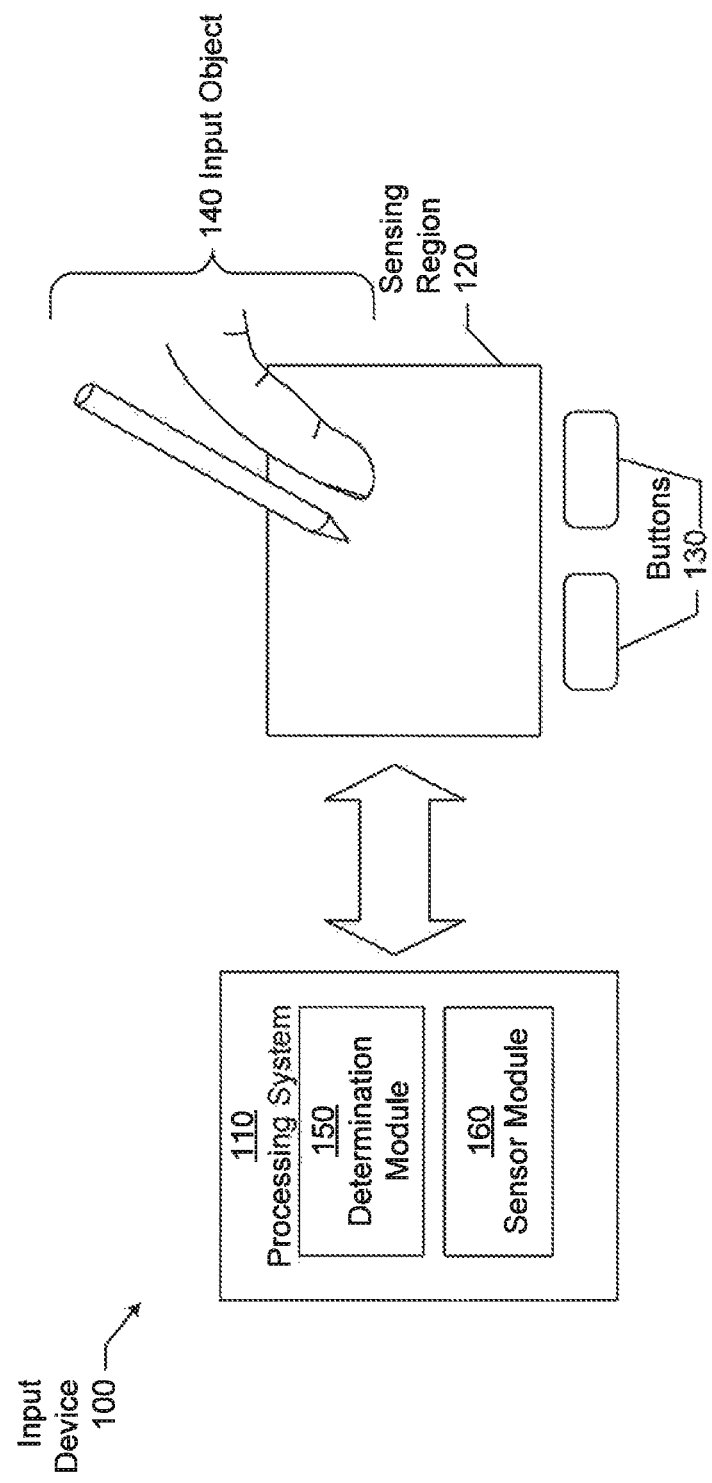
FIG. 1 shows a block diagram of an example system that includes an input device in accordance with one or more embodiments.

Specific embodiments of the disclosed technology will now be described in detail with reference to the accompanying figures. Like elements in the various figures may be denoted by like reference numerals and/or like names for consistency.

The following detailed description is merely exemplary in nature, and is not intended to limit the disclosed technology or the application and uses of the disclosed technology. Furthermore, there is no intention to be bound by any expressed or implied theory presented in the preceding technical field, background, brief summary or the following detailed description.

In the following detailed description of embodiments of the disclosed technology, numerous specific details are set forth in order to provide a more thorough understanding of the disclosed technology. However, it will be apparent to one of ordinary skill in the art that the disclosed technology may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Various embodiments of the present disclosed technology provide input devices and methods that facilitate improved usability. In particular, one or more embodiments of the disclosed technology are directed to display devices integrated with sensor electrodes for capacitive sensing. In particular, the capacitive sensing that detects the location of one or more input objects in a sensing region may also measure one or more bending responses of an input surface. Spatial deformation (i.e. bending) can be observed as far as, for example, a few centimeters away from the point where the deforming force is applied. Accordingly, the sensor electrodes for capacitive sensing may be used to detect forces applied elsewhere (i.e., away from the direct sensing region of the sensor electrodes), in accordance with one or more embodiments. Thus, through additional processing, a matrix electrode array may be enabled to sense forces elsewhere to implement, e.g., force-sensitive buttons, without requiring installation of additional force sensors.

Turning now to the figures, FIG. 1 is a block diagram of an exemplary input device (100), in accordance with embodiments of this disclosed technology. The input device (100) may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device (100) and separate joysticks or key switches. Further example electronic systems include peripherals, such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system may be a host or a slave to the input device.

The input device (100) may be implemented as a physical part of the electronic system, or may be physically separate from the electronic system. Further, portions of the input device (100) may be part of the electronic system. For example, all or part of the determination module may be implemented in the device driver of the electronic system. As appropriate, the input device (100) may communicate with parts of the electronic system using any one or more of the following: buses, networks, and other wired or wireless interconnections. Example communication protocols include I2C, SPI, PS/2, Universal Serial Bus (USB), Bluetooth®, RF, and IrDA protocols.

In FIG. 1, the input device (100) is shown as a proximity sensor device (also often referred to as a "touchpad" or a "touch sensor device") configured to sense input provided by one or more input objects (140) in a sensing region (120). Example input objects include fingers and styli, as shown in FIG. 1. Throughout the specification, the singular form of input object may be used. Although the singular form is used, multiple input objects may exist in the sensing region (120). Further, the particular input objects in the sensing region may change over the course of one or more gestures. To avoid unnecessarily complicating the description, the singular form of input object is used and refers to all of the above variations.

The sensing region (20) encompasses any space above, around, in and/or near the input device (100) in which the input device (100) is able to detect user input (e.g., user input provided by one or more input objects (140)). The sizes, shapes, and locations of particular sensing regions may vary widely from embodiment to embodiment.

In some embodiments, the sensing region (120) extends from a surface of the input device (100) in one or more directions into space until signal-to-noise ratios prevent sufficiently accurate object detection. The extension above the surface of the input device may be referred to as the above surface sensing region. The distance to which this sensing region (120) extends in a particular direction, in various embodiments, may be on the order of less than a millimeter, millimeters, centimeters, or more, and may vary significantly with the type of sensing technology used and the accuracy desired. Thus, some embodiments sense input that includes no contact with any surfaces of the input device (100), contact with an input surface (e.g., a touch surface) of the input device (100), contact with an input surface of the input device (100) coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region (120) has a rectangular shape when projected onto an input surface of the input device (100).

The input device (100) may utilize any combination of sensor components and sensing technologies to detect user input in the sensing region (120). The input device (100) may include one or more sensing elements for detecting user input. As several non-limiting examples, the input device (100) may use capacitive, elastive, resistive, inductive, magnetic, acoustic, ultrasonic, and/or optical techniques.

Some implementations are configured to provide images that span one, two, three, or higher-dimensional spaces. Some implementations are configured to provide projections of input along particular axes or planes. Further, some implementations may be configured to provide a combination of one or more images and one or more projections.

In some resistive implementations of the input device (100), a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device (100), one or more sensing elements pick up loop currents induced by a resonating coil or pair of coils. Some combination of the magnitude, phase, and frequency of the currents may then be used to determine positional information.

In some capacitive implementations of the input device (100), voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g., system ground), and by detecting the capacitive coupling between the sensor electrodes and input objects. The reference voltage may be a substantially constant voltage or a varying voltage, and in various embodiments, the reference voltage may be system ground. Measurements acquired using absolute capacitance sensing methods may be referred to as absolute capacitive measurements.

Some capacitive implementations utilize "mutual capacitance" (or "trans capacitance") sensing methods based on changes in the capacitive coupling between sensor electrodes. In various embodiments, an input object near the sensor electrodes alters the electric field between the sensor electrodes, thus changing the measured capacitive coupling. In one implementation, a mutual capacitance sensing method operates by detecting the capacitive coupling between one or more transmitter sensor electrodes (also "transmitter electrodes" or "transmitter") and one or more receiver sensor electrodes (also "receiver electrodes" or "receiver"). Transmitter signals may be electrically applied to transmitter electrodes, where the transmitter signals may be relative to a reference voltage (e.g., system ground). Receiver sensor electrodes may be held substantially constant relative to the reference voltage to facilitate receipt of resulting signals. The reference voltage may be a substantially constant voltage and, in various embodiments, the reference voltage may be system ground. The transmitter electrodes may be electrically driven with respect to the receiver electrodes to transmit transmitter signals and to facilitate receipt of resulting signals. A resulting signal may include effect(s) corresponding to one or more transmitter signals, and/or to one or more sources of environmental interference (e.g., other electromagnetic signals). The effect(s) may be the transmitter signal, a change in the transmitter signal caused by one or more input objects and/or environmental interference, or other such effects. Sensor electrodes may be dedicated transmitters or receivers, or may be configured to both transmit and receive. Measurements acquired using mutual capacitance sensing methods may be referred to as mutual capacitance measurements.

Further, the sensor electrodes may be of varying shapes and/or sizes. The same shapes and/or sizes of sensor electrodes may or may not be in the same groups. For example, in some embodiments, receiver electrodes may be of the same shapes and/or sizes while, in other embodiments, receiver electrodes may be varying shapes and/or sizes.

In FIG. 1, a processing system (110) is shown as part of the input device (100). The processing system (110) is configured to operate the hardware of the input device (100) to detect input in the sensing region (120). The processing system (110) includes parts of, or all of, one or more integrated circuits (ICs) and/or other circuitry components. For example, a processing system for a mutual capacitance sensor device may include transmitter circuitry configured to transmit signals with transmitter sensor electrodes, and/or receiver circuitry configured to receive signals with receiver sensor electrodes. Further, a processing system for an absolute capacitance sensor device may include driver circuitry configured to drive absolute capacitance signals onto sensor electrodes, and/or receiver circuitry configured to receive signals with those sensor electrodes. In one or more embodiments, a processing system for a combined mutual and absolute capacitance sensor device may include any combination of the above described mutual and absolute capacitance circuitry. In some embodiments, the processing system (110) also includes electronically-readable instructions, such as firmware code, software code, and/or the like. In some embodiments, components composing the processing system (110) are located together, such as near sensing element(s) of the input device (100). In other embodiments, components of processing system (110) are physically separate with one or more components close to the sensing element(s) of the input device (100), and one or more components elsewhere. For example, the input device (100) may be a peripheral coupled to a computing device, and the processing system (110) may include software configured to run on a central processing unit of the computing device and one or more ICs (perhaps with associated firmware) separate from the central processing unit. As another example, the input device (100) may be physically integrated in a mobile device, and the processing system (110) may include circuits and firmware that are part of a main processor of the mobile device. In some embodiments, the processing system (110) is dedicated to implementing the input device (100). In other embodiments, the processing system (110) also performs other functions, such as operating display screens, driving haptic actuators/mechanisms (not shown), etc.

The processing system (110) may be implemented as a set of modules that handle different functions of the processing system (110). Each module may include circuitry that is a part of the processing system (110), firmware, software, and/or a combination thereof. In various embodiments, different combinations of modules may be used. For example, as shown in FIG. 1, the processing system (110) may include a determination module (150) and a sensor module (160). The determination module (150) may include functionality to determine when at least one input object is in a sensing region, determine signal to noise ratio, determine positional information of an input object, identify a gesture, determine an action to perform based on the gesture, a combination of gestures or other information, and/or perform other operations.

The sensor module (160) may include functionality to drive the sensing elements to transmit transmitter signals and receive the resulting signals. For example, the sensor module (160) may include sensor circuitry that is coupled to the sensing elements. The sensor module (160) may include, for example, a transmitter module and a receiver module. The transmitter module may include transmitter circuitry that is coupled to a transmitting portion of the sensing elements. The receiver module may include receiver circuitry coupled to a receiving portion of the sensing elements and may include functionality to receive the resulting signals.

Alternative or additional modules may exist in accordance with one or more embodiments. Such alternative or additional modules may correspond to distinct modules or sub-modules of one or more of the modules discussed above. Example alternative or additional modules include hardware operation modules for operating hardware such as sensor electrodes and display screens, data processing modules for processing data such as sensor signals and positional information, reporting modules for reporting information, and identification modules configured to identify gestures, such as mode changing gestures, and mode changing modules for changing operation modes. Further, the various modules may be combined in separate integrated circuits. For example, a first module may be comprised at least partially within a first integrated circuit and a separate module may be comprised at least partially within a second integrated circuit. Further, portions of a single module may span multiple integrated circuits. In some embodiments, the processing system as a whole may perform the operations of the various modules.

In some embodiments, the processing system (110) responds to user input (or lack of user input) in the sensing region (120) directly by causing one or more actions. Example actions include changing operation modes, as well as graphical user interface (GUT) actions such as cursor movement, selection, menu navigation, haptic actuation, and other functions. In some embodiments, the processing system (110) provides information about the input (or lack of input) to some part of the electronic system (e.g., to a central processing system of the electronic system that is separate from the processing system (110), if such a separate central processing system exists). In some embodiments, some part of the electronic system processes information received from the processing system (110) to act on user input, such as to facilitate a full range of actions, including mode changing actions and GUI actions.

For example, in some embodiments, the processing system (110) operates the sensing element(s) of the input device (100) to produce electrical signals indicative of input (or lack of input) in the sensing region (120). The processing system (110) may perform any appropriate amount of processing on the electrical signals in producing the info' nation provided to the electronic system. For example, the processing system (110) may digitize analog electrical signals obtained from the sensor electrodes. As another example, the processing system (110) may perform filtering or other signal conditioning. As yet another example, the processing system (110) may subtract or otherwise account for a baseline, such that the information reflects a difference between the electrical signals and the baseline. As yet further examples, the processing system (110) may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

"Force information" as used herein is intended to broadly encompass force information regardless of format. For example, the force information may be provided for each object as a vector or scalar quantity. As another example, the force information may be provided as an indication that determined force has or has not crossed a threshold amount. As other examples, the force information can also include time history components used for gesture recognition. As will be described in greater detail below, positional information and force information from the processing systems may be used to facilitate a full range of interface inputs, including use of the proximity sensor device as a pointing device for selection, cursor control, scrolling, and other functions.

In some embodiments, the input device (100) is implemented with additional input components that are operated by the processing system (110) or by some other processing system. These additional input components may provide redundant functionality for input in the sensing region (120), or some other functionality. FIG. 1 shows buttons (130) near the sensing region (120) that may be used to facilitate selection of items using the input device (100). Other types of additional input components include sliders, balls, wheels, switches, and the like. Conversely, in some embodiments, the input device (100) may be implemented with no other input components.

In some embodiments, the input device (100) includes a touch screen interface, and the sensing region (120) overlaps at least part of an active display area (e.g., active display area (310), illustrated in FIG. 3). For example, the input device (100) may include substantially transparent sensor electrodes overlaying the display screen and provide a touch screen interface for the associated electronic system. The display screen may be any type of dynamic display capable of displaying a visual interface to a user, and may include any type of light-emitting diode (LED), organic LED (OLED), cathode ray tube (CRT), liquid crystal display (LCD), plasma, electroluminescence (EL), or other display technology. The input device (100) and the display screen may share physical elements. For example, some embodiments may utilize some of the same electrical components for displaying and sensing. In various embodiments, one or more display electrodes of a display device may be configured for both display updating and input sensing. As another example, the display screen may be operated in part or in total by the processing system (110).

It should be understood that while many embodiments are described in the context of a fully-functioning apparatus, the mechanisms of the various embodiments are capable of being distributed as a program product (e.g., software) in a variety of forms. For example, the mechanisms of various embodiments may be implemented and distributed as a software program on information-bearing media that are readable by electronic processors (e.g., non-transitory computer-readable and/or recordable/writable information bearing media that is readable by the processing system (110)). Additionally, the embodiments may apply equally regardless of the particular type of medium used to carry out the distribution. For example, software instructions in the form of computer readable program code to perform one or more embodiments may be stored, in whole or in part, temporarily or permanently, on a non-transitory computer-readable storage medium. Examples of non-transitory, electronically-readable media include various discs, physical memory, memory, memory sticks, memory cards, memory modules, and or any other computer readable storage medium. Electronically-readable media may be based on flash, optical, magnetic, holographic, or any other storage technology.

Although not shown in FIG. 1, the processing system, the input device, and/or the host system may include one or more computer processor(s), associated memory (e.g., random access memory (RAM), cache memory, flash memory, etc.), one or more storage device(s) (e.g., a hard disk, an optical drive such as a compact disk (CD) drive or digital versatile disk (DVD) drive, a flash memory stick, etc.), and numerous other elements and functionalities. The computer processor(s) may be an integrated circuit for processing instructions. For example, the computer processor(s) may be one or more cores or micro-cores of a processor. Further, one or more elements of one or more embodiments may be located at a remote location and connected to the other elements over a network. Further, embodiments may be implemented on a distributed system having several nodes, where each portion an embodiment may be located on a different node within the distributed system. In one or more embodiments, the node corresponds to a distinct computing device. Alternatively, the node may correspond to a computer processor with associated physical memory. The node may alternatively correspond to a computer processor or micro-core of a computer processor with shared memory and/or resources.

While FIG. 1 shows a configuration of components, other configurations may be used without departing from the scope of the disclosed technology. For example, various components may be combined to create a single component. As another example, the functionality performed by a single component may be performed by two or more components. Accordingly, for at least the above-recited reasons, embodiments of the disclosed technology should not be considered limited to the specific arrangements of components and/or elements shown in FIG. 1.

Figure 2:
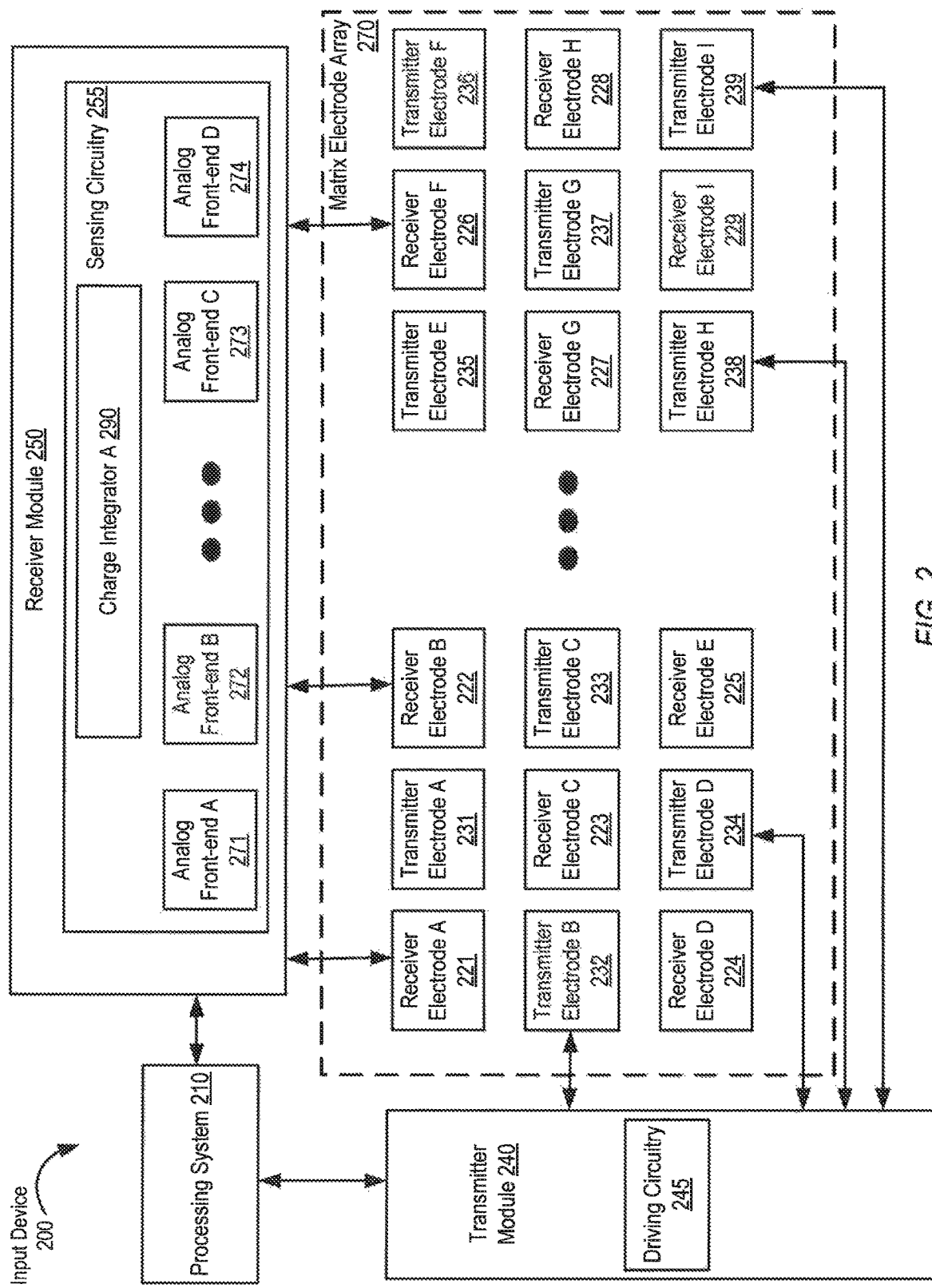
FIG. 2 shows a schematic view of an input device in accordance with one or more embodiments.

Turning to FIG. 2, FIG. 2 shows a schematic view of an input device (200) in accordance with one or more embodiments. As shown in FIG. 2, the input device (200) may include a receiver module (250), a transmitter module (240), and a processing system (210). The processing system (210) may be similar to processing system (110) described in FIG. 1 and the accompanying description and/or the computing system (700) described in FIG. 7 and the accompanying description. The transmitter module (240) may include driving circuitry (245) that may be similar to transmitter circuitry described in FIG. 1 and the accompanying description. For example, driving circuitry (245) may include hardware and/or software that includes functionality to generate one or more sensing signals transmitted over one or more transmitter electrodes (e.g., transmitter electrode A (231), transmitter electrode B (232), transmitter electrode C (233), transmitter electrode D (234), transmitter electrode E (235), transmitter electrode F (236), transmitter electrode G (237), transmitter electrode H (238), transmitter electrode (239)). The transmitter electrodes (231, 232, 233, 234, 235, 236, 237, 238, 239) may be similar to the transmitter electrodes described in FIG. 1 and the accompanying description. Likewise, various routing traces (not shown), such as gate lines and source lines, may couple driving circuitry (245) with the transmitter electrodes (231, 232, 233, 234, 235, 236, 237, 238, 239).

Moreover, the receiver module (250) may include sensing circuitry (255). For example, sensing circuitry (255) may include hardware and/or software that includes functionality to obtain one or more resulting signals from one or more receiver electrodes (e.g., receiver electrode A (221), receiver electrode B (222), receiver electrode C (223), receiver electrode D (224), receiver electrode E (225), receiver electrode F (226), receiver electrode G (227), receiver electrode H (228), receiver electrode I (229)) in response to one or more sensing signals transmitted over the transmitter electrodes (231, 232, 233, 234, 235, 236, 237, 238, 239). The sensing circuitry (255) may be similar to the receiver circuitry described in FIG. 1 and the accompanying description.

In particular, the sensing circuitry (255) may include various analog front-ends (e.g., analog front-end A (271), analog front-end B (272), analog front-end C (273), analog front-end D (274)), which may include various analog conditioning circuitry. For example, analog-front ends may include operational amplifiers, digital-signal processing components, charge collection mechanisms, filters, and various application-specific integrated circuits for detecting and analyzing resulting signals obtained from the receiver electrodes (221, 222, 223, 224, 225, 226, 227, 228, 229). Likewise, the receiver electrodes (221, 222, 223, 224, 225, 226, 227, 228, 229) may be similar to the receiver electrodes described in FIG. 1 and the accompanying description. Likewise, various routing traces (not shown) may couple sensing circuitry (255) with the receiver electrodes (221, 222, 223, 224, 225, 226, 227, 228, 229).

In one or more embodiments, the input device (200) includes a plurality of electrodes. These electrodes may be organized in a matrix electrode array (e.g., matrix electrode array (270)). For example, the matrix electrode array (270) may include the transmitter electrodes (231, 232, 233, 234, 235, 236, 237, 238, 239) and the receiver electrodes (221, 222, 223, 224, 225, 226, 227, 228, 229) disposed according to a predetermined shape, such as a square, rectangle, circle, regular and irregular shapes, and/or other geometric shapes. Within the matrix electrode array (270), receiver electrodes and transmitter electrodes may alternate in rows and/or columns to form a predetermined pattern, e.g., receiver electrode then transmitter electrode, two receiver electrodes then one transmitter electrode, etc.

Continuing with FIG. 2, in one or more embodiments, transmitter electrodes and/or routing traces are configured based on various types analog front-ends. For example, in one type of analog front-end, the analog front-end may include and/or be coupled with a charge integrator. In another type of analog front-end, the analog front-end may be configured to operate using a current conveyor. Accordingly, an analog front-end may include an input terminal and a reference terminal. The input terminal may receive a resulting signal from a receiver electrode, while the reference terminal may be set to a DC voltage or a modulated voltage.

Moreover, various modes may be implemented with a particular analog front-end. In one mode, where a DC voltage is used at the reference terminal, sensing signals transmitted to transmitter electrodes may be modulated. Likewise, gate lines may be set to one or more DC voltage levels, while source lines may be set to one or more DC voltage levels or a high impedance (HiZ) level. In another mode, where a modulated signal is applied to the reference terminal, transmitter electrodes may be set at one or more DC voltage levels. As such, the gate lines may be guarded with a modulation signal with a similar waveform as the modulated signal applied to the reference terminal. The source lines may be similarly guarded in the manner as the gate lines or set to a HiZ level. The different modes of an analog front-end may be implemented with respect to transmitter electrodes for capacitive sensing as well as sensor electrodes used for display updating.

Continuing with FIG. 2, the sensing circuitry (255) may include one or more charge integrators (e.g., charge integrator A (290)). In particular, a charge integrator may include hardware and/or software that includes functionality for transforming one or more resulting signals into a voltage output proportional a respective resulting signal. For example, a charge integrator may include an amplifier with an input terminal and a reference terminal that is configured in a similar manner as described above with respect to the input terminal and reference terminal of the analog front-end. Thus, charge integrator A (290) may include one or more amplifiers, various feedback capacitors, and other circuit components.

The sensing circuitry (255) may further include one or more current conveyors. For example, a current conveyor may include hardware and/or software for replicating a resulting signal and/or an approximation of a resulting signal. A current conveyor may also be configured according to one or more modes describes above with respect to the various types of analog front-ends.

Figure 3A:
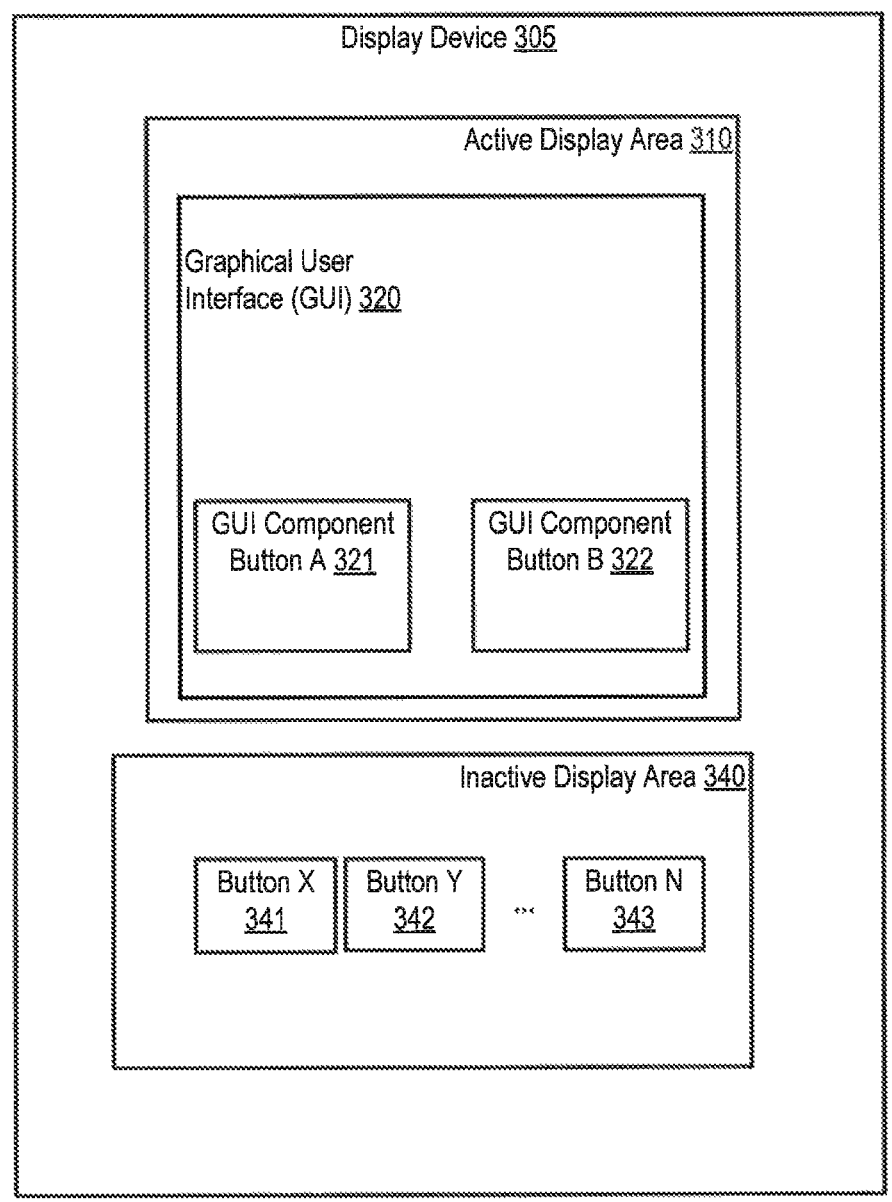
FIGS. 3A and 3B show a schematic view of an electronic system in accordance with one or more embodiments.

Turning to FIG. 3A, FIG. 3A shows an electronic system (300) in accordance with one or more embodiments. In particular, the electronic system (300) may include a processing system (not shown), a host device (not shown), and a display device (305). The processing system may be similar to the processing system (110) and/or the processing system (210) described above in FIGS. 1 and 2 and the accompanying description. The host device may be a computing system coupled to the processing system and the display device (305) similar to computing system (700) described below in FIG. 7 and the accompanying description.

Continuing with FIG. 3A, a display device may include a graphical user interface (GUI) (e.g., graphical user interface (320)) within an active display area (e.g., active display area (310)). A graphical user interface may include a combination of software and/or hardware that provides various graphical components (e.g., GUI component button A (321), GUI component button B (322)) for both presenting visual information to a user and/or obtaining user inputs from the user. In particular, the active display area (310) may correspond to a screen with various display pixels in the electronic system (300) where the processing system or the host device may include functionality to cause display updates among the display pixels. Furthermore, the graphical components may be displayed using one or more types of illumination devices, such as LEDs, OLEDs, LCDs, etc.

Figure 3B:
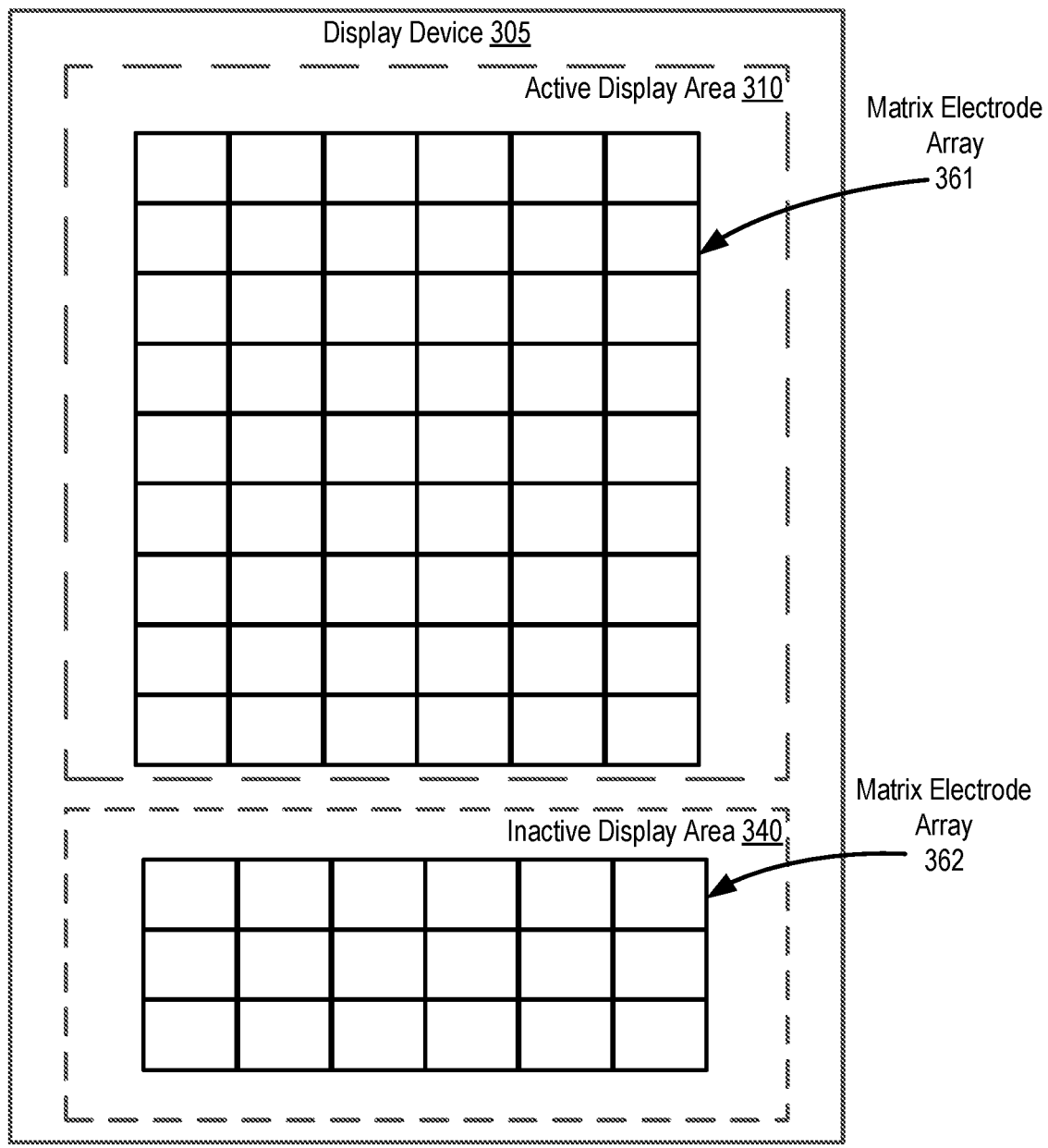

Turning to FIG. 3B, a display device may include sensor electrodes (e.g., matrix electrode array (361)). For example, the sensor electrodes may be similar to the receiver electrodes and/or transmitter electrodes described above in FIGS. 1 and 2 and the accompanying description. At least some of the sensor electrodes are configured to sense force in addition to touch, resulting for example from a user depressing the display cover (350). Signals obtained from the touch and/or force sensing electrodes may be used to update content shown in the active display area (310), thus enabling, for example, control of the graphical user interface (320) using touch and force signals. The force measurement may be based on a change in capacitance when a compressible layer is compressed, as a result of the force input. As a result of the compression, the spacing between sensor electrodes and a conductor, separated from the sensing electrodes may reduce, thereby resulting in a capacity increase. The conductor may be, for example, the display cover (350) of the display device (305) or any other conductive layer above or below the sensor electrodes. The compressible layer may be, for example, a foam or air or any other type of compressible material. In some embodiments, the sensor electrodes are capable of measuring both force and touch, resulting, e.g., from an input object such as a finger or a stylus being in contact or in proximity to the surface of the display device. Moreover, some of the sensor electrodes may include common electrodes. In particular, a common electrode may include functionality for transmitting a display control signal for updating one or more display pixels and for performing capacitive sensing. A display control signal may be transmitted over an electrode during a frame of display update sequence. Thus, a processing system may use a display control signal may change a color and/or intensity of a display pixel or subpixel. Alternatively, the active display area (310) may include sensor electrodes dedicated to capacitive sensing and other electrodes dedicated to display updates. In some embodiments, the display device (305) operates a frame sequence that designates one or more frames for performing display updates and one or more frames for capacitive sensing. The display device may further optionally include an additional matrix electrode array (362). This additional matrix electrode array (362), if present, may be located in the inactive display area and may be configured to sense touch but not force.

Returning to FIG. 3A, a display device may include an inactive display area (e.g., inactive display area (340)). An inactive display area may include a portion of a display device with no sensor electrodes and no display pixels. In some embodiments, an inactive display area includes one or more regions of a display screen that do not illuminate and/or are separate from a visual interface, while in other embodiments the inactive display is illuminated. In some embodiments, an inactive display area does not change appearance when the active display area is updated by a processing system or host device, while in other embodiments both the inactive display area and the active display area are updated and thus change appearance. Components within an inactive display area may be non-GUI components, e.g., interface components operated without a graphical user interface provided by a host device. Alternatively, an inactive display area may display graphical components. While a single active display area and a single inactive display area are shown in FIGS. 3A and 3B, in one or more embodiments, multiple active display areas and/or multiple inactive display areas may be found in a display device. Those skilled in the art will appreciate that the matrix electrode array (361) may be sized to span the entire active display area (310), or alternatively the matrix electrode array (361) may be smaller than the active display area. Further, the matrix electrode array (361) may also extend beyond the active display area, and a plurality of electrodes may be arranged from edge to edge of a display panel or an input surface of a display device, even when the display panel or input surface extends to the edges of the display device. Moreover, a display device, in accordance with one or more embodiments, includes a display cover (350). The display cover may be a cover glass, lens, or other input surface that encloses an active display area and an inactive display area. The display cover (350) may further be any other type of shared layer or surface that extends over the active display area (310) and over the inactive display area (340). The display cover (350) may be disposed on the display panel or input surface of the display device to cover the display device from edge to edge.

In some embodiments, an inactive display area (340) includes one or more force-activated buttons (e.g., button X (341), button Y (342), button N (343)) that are triggered based on a particular bending response. The inactive display area (340) may or may not have a common region with the active display area (310). Button X (341), button. Y (342), and button N (343) may be triggered based on capacitive scans performed by the matrix electrode array (361). More specifically, in accordance with one or more embodiments, the force applied by the user when depressing one of the buttons (341, 342, 343) causes a deformation which can be measured remotely by the matrix electrode array (361), as further described below. In some embodiments, capacitive sensing is available in the region where the force-activated buttons are installed, i.e., a matrix electrode array (362) is installed in the inactive display area. The matrix electrode array (362) may be an array separate from the matrix electrode array (361), or it may be an extension of the matrix electrode array (361).

While in FIG. 3B, the matrix electrode array (362) is shown as being located in the inactive display area (340), the matrix electrode array (362) may also be located elsewhere, e.g., partially or fully in the active display area. The capacitive sensing of the matrix electrode array (362) may, however, be limited to the detection of touch, but not force, as discussed with reference to FIG. 3B. The buttons (341, 342, 343) may correspond to a home button, a back button, and/or a multitasking button for a smartphone interface that may be controlled by a processing system and/or host device. A home button may perform an interface action that returns a user to a specific window within a graphical user interface. Likewise, a button in the inactive display area may include functionality for performing a fingerprint scan, using the capacitive or an optical sensor in the inactive display area.

Figure 4:
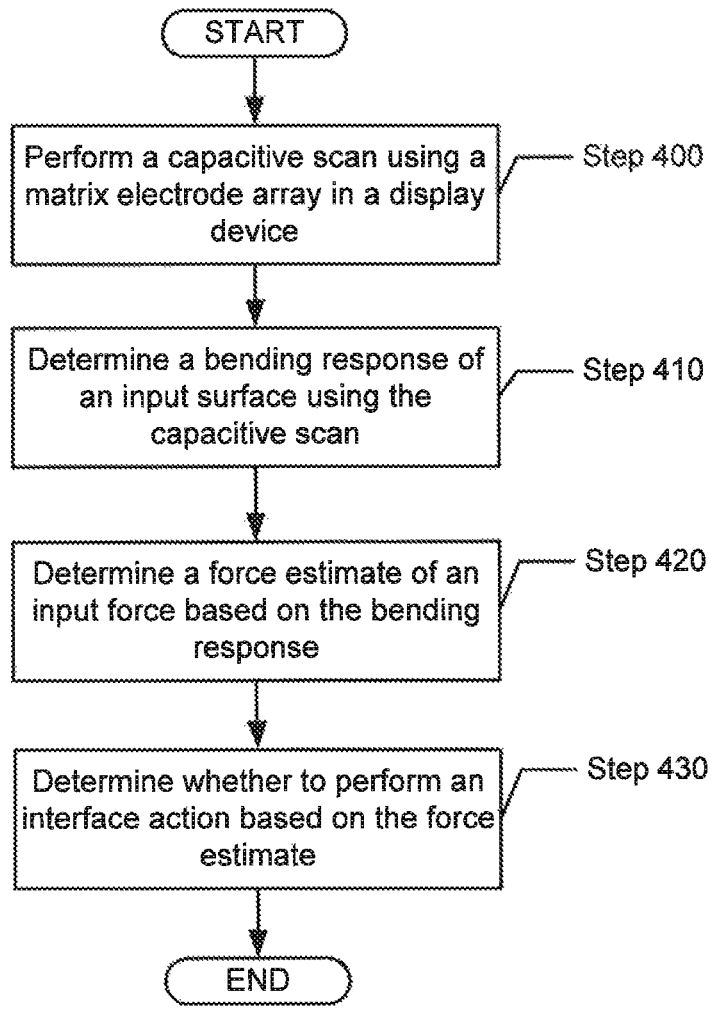
FIG. 4 shows a flowchart in accordance with one or more embodiments.

Turning to FIG. 4, FIG. 4 shows a flowchart in accordance with one or more embodiments. Specifically, FIG. 4 describes a method for detecting a force input in a display device. The process shown in FIG. 4 may involve, for example, one or more components discussed above in reference to FIGS. 1, 2, 3A, and 3B (e.g., processing system (110)). While the various steps in FIG. 4 are presented and described sequentially, one of ordinary skill in the art will appreciate that some or all of the steps may be executed in different orders, may be combined or omitted, and some or all of the steps may be executed in parallel. Furthermore, the steps may be performed actively or passively.

In Step 400, a capacitive scan is performed using a matrix electrode array in a display device in accordance with one or more embodiments. For example, a processing system in the display device may obtain a capacitive image using sensor electrodes disposed inside an active display area in a display device. The capacitive image may be obtained from various absolute capacitive measurements that correspond to a change in a variable capacitance between an input surface and the sensor electrodes. Sensor electrodes in the matrix electrode array may be similar to the transmitter electrodes and/or receiver electrodes described above in FIGS. 1 and 2, or the matrix electrode arrays described above in FIG. 3B.

In some embodiments, the matrix electrode array is employed to perform different types of sensing. More specifically, the matrix electrode array may be used to determine a bending response in the sensing region. This bending response may be a result of a force being applied to an input surface in the sensing region, or elsewhere. The matrix electrode array may further be used for determining object information regarding one or more input objects in the sensing region. In some embodiments, for example, a matrix electrode array is configured for transmitting sensing signals and obtaining resulting signals in a similar manner as described in FIGS. 1 and 2 and the accompanying description. Object information may include positional information similar to the positional information described in FIG. 1 and the accompanying description. Object information may also include various characteristics of an input object, such as input object size and/or the type of input object, e.g., an index finger, a palm, a user's face, stylus, etc.

In some embodiments, a plurality of electrodes is further available in the inactive display area. If present, these electrodes detect touch. The plurality of electrodes may be arranged in matrix electrode array. The detection of touch may include localizing the touch, but may further also be used to discriminate additional features, such as when obtaining a fingerprint.

In Step 410, a bending response of an input surface is determined using a capacitive scan in accordance with one or more embodiments. For example, a processing system may detect a bending response of an input surface and/or other display layers within a display device. In particular, the bending response may describe a spatial propagation of a deformation of an input surface or another display layer. The bending response may correspond to an array of capacitive measurements as measured by a matrix array of sensor electrodes, e.g., similar to a capacitive image obtained using capacitive sensing in Step 400. As such, a bending response may be detected as far as few centimeters away from a point where an input force deforms an input surface and/or other portions of the display device. In some embodiments, for example, a region of an analyzed bending response corresponds to a non-GUI component button disposed outside an active display area of a display device. As a user presses on the location of the button, the input surface may bend or deform, which may cause an InCell sensor in the display device to measure capacitively a bending response under the active display area.

Figure 5:
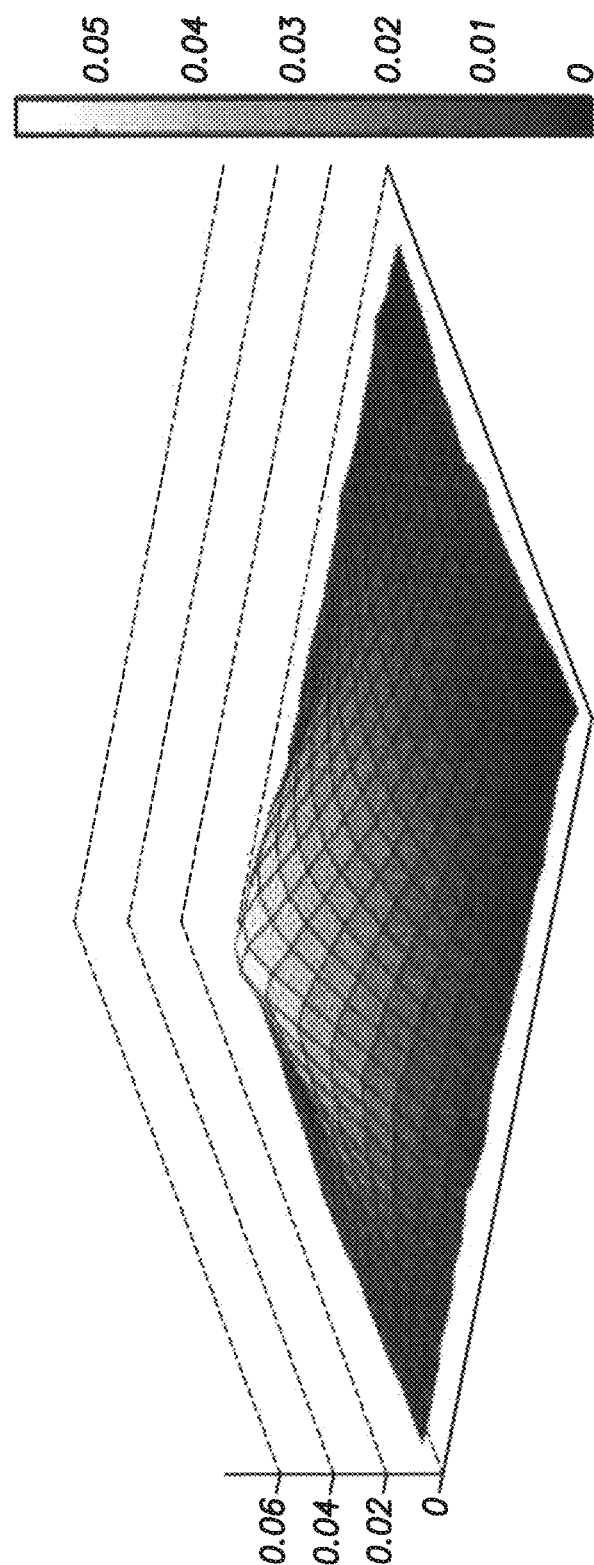
FIG. 5 shows an example of a bending response in accordance with one or more embodiments.

Turning to FIG. 5, FIG. 5 provides an example of a bending response in accordance with one or more embodiments. The following example is for explanatory purposes only and are not intended to limit the scope of the disclosed technology. FIG. 5 illustrates an example bending response as detected by a display device. An input force is applied in a central area of the plot, resulting in deformation of the input surface. This deformation extends beyond the region where the input force is applied, and is therefore measurable elsewhere. As a touch of a finger applies an input force to an input surface of the display device, for example, the bending response may be analyzed by a processing system to determine a force estimate.

Returning to FIG. 4, in Step 420, a force estimate of an input force is determined based on a bending response in accordance with one or more embodiments. More specifically, if an input force is applied in an area that is not directly covered by the matrix electrode array, the bending response may be measurable by the matrix electrode, due the spatial spread of the bending response, as illustrated in FIG. 5. In one or more embodiments, a processing system may compare one or more spatial propagations values and/or capacitive measurements from the bending response to a deformation model to determine a particular force value of the input force. For example, a processing system may compare bending response with other spatial deformation templates and/or bending response threshold values to determine the force estimate. In particular, a processing system may analyze bending response values and/or changes to specific bending response values over a predetermined time interval to determine an amount of force applied to an input surface. The deformation model may be represented in a lookup table. In other embodiments, a processing system may apply one or more mathematical functions to the bending response that identifies a force estimate using one or more bending response values.

Furthermore, the processing system may compare different bending responses detected using multiple capacitive images to arrive at a particular force estimate value. For example, the duration of a bending response, the type of input object that produces the bending response, and/or shape of deformation in a bending response may be used to determine different force estimates. The location of the bending response on an input surface and/or the area of the deformation may also be used by the processing system to determine the force estimate.

In Step 430, a determination is made whether to perform an interface action based on a force estimate in accordance with one or more embodiments. For example, a processing system may analyze a force estimate to determine whether to report the force estimate to a host device. In another example, only after determining that the force estimate exceeds one or more force thresholds may a processing system report the force estimate directly to a host device. In some embodiments, the processing system merely reports whether the force estimate exceeds a force threshold and not the actual magnitude of the force value corresponding to the force estimate.

The interface action may, thus, correspond to a force-sensitive button located outside an active display area. For example, a particular type of input force applied by an input object may be detected using no additional force sensors or other mechanical/electrical changes to the design of the display device, as may be the case in an InCell force implementation. Moreover, determining a force estimate with the bending response may reduce a false activation of an electronic system component (e.g., a GUI component, interface components located in an inactive display area, etc.). For example, by specifying a predetermined force value of an input force, the processing system may ignore activations of electronic system components without application of an input force with the specified force value or that exceeds the specified force value. In particular, a spatial propagation of the input force may provide a way of activating various components in a display device.

If touch is separately measured using a matrix electrode array located in the inactive display area, the determination whether to perform an interface action may also be based on the detection of the touch. For example, if the matrix electrode array is used to perform fingerprint detection, an interface action may be performed based on the detection of a matching fingerprint. Further, detection of a touch by the matrix electrode array located in the inactive display area without detection of a significant force (force detection performed by the matrix electrode array in the active display area) may trigger an interface action that is different from an interface action triggered by a detection of touch in combination with a significant force.

Figure 6A:
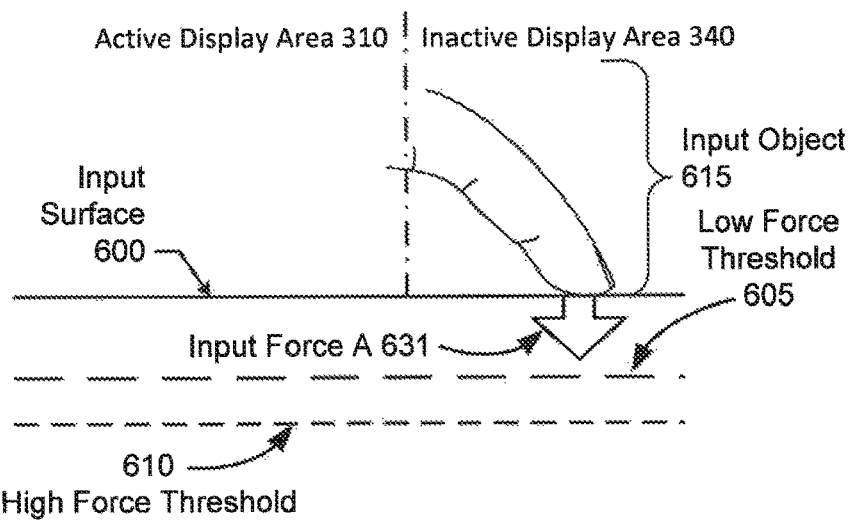
FIGS. 6A, 6B, and 6C show examples of force sensing in accordance with one or more embodiments.
Figure 6B:
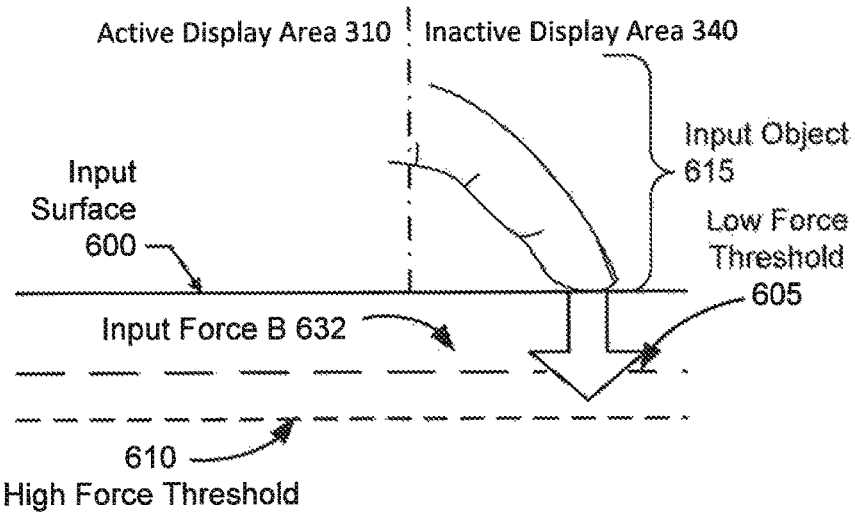
Figure 6C:
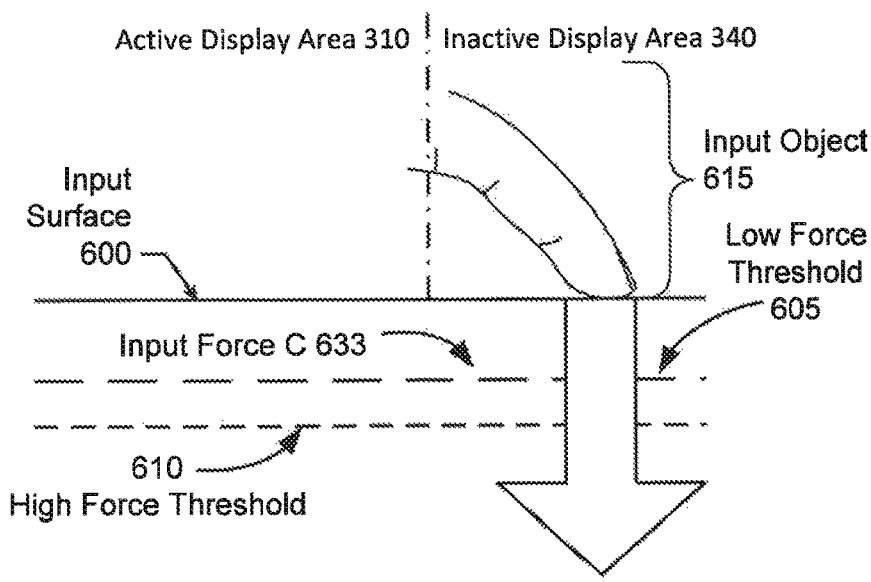

Turning to FIGS. 6A, B, and 6C, FIGS. 6A-, B, and 6C show schematic cross-sectional diagrams in accordance with one or more embodiments. As shown in FIGS. 6A, B, and 6C, an input object (615) may apply various input forces (e.g., input force A (631), input force B (632), and input force C (633)) to an input surface (600) of an input device. In particular, an input force may include an amount of force exerted by the input object (615) to the input surface (600) of the input device. Thus, the input force may span various locations in a sensing region of the input surface (600) of the input device, and may also include one or more different force magnitudes at different locations of the input surface (600). FIGS. 6A, 6B, and 6C illustrate scenarios in which the input forces are applied in an inactive display area (340), where no matrix electrode array is directly located. The force sensing, via the bending response is performed by a matrix electrode array (not shown in FIGS. 6A, 6B, and 6C) located in the active display area.

In one or more embodiments, the input device (600) includes a low force threshold (605) and a high force threshold (610). As such, the force thresholds (605, 210) may correspond to different values of force information, which may categorize different intensities for different input forces. In one or more embodiments, a force threshold corresponds to a specific amount of force (e.g., a specific magnitude of force and/or pressure). In one or more embodiments, a force threshold corresponds to a range of different force magnitudes. For example, the low force threshold (605) and the high force threshold (610) may be designated in a lookup table accessed by a processing system. While force thresholds may be defined using various amounts of force, in one or more embodiments, a force threshold is defined using the duration of time that an input force is applied above a specific force value. In one or more embodiments, a force threshold is defined by an amount of area on an input surface that obtains an input force above a specific force value.

Those skilled in the art will recognize that the force thresholds used for detection are not necessarily constant level force thresholds. Consider the bending response illustrated in FIG. 5. As shown, a bending response tapers off with increasing distance from the location at which the input forces are applied. Force thresholds may accordingly also be spatially variable to consider this characteristic. For example, a higher force threshold may apply for bending response measurements obtained by sensing elements in closer proximity to the location at which the input force is applied, whereas a lower force threshold may apply for bending response measurements obtained by sensing elements that are more distant from the location at which the input force is applied.

Furthermore, as shown in FIG. 6A, the input force A (631) has a force magnitude that is below both the low force threshold (605) and the high force threshold (610). In comparison, as shown in FIG. 6B, the input force B (632) has a force magnitude that exceeds the low force threshold (605), but fails to surpass the high force threshold (610). As shown in FIG. 6C, the input force C (633) may surpass both the low force threshold (605) and the high force threshold (610). While two force thresholds are shown in FIGS. 6A, B, and 6C, other embodiments are contemplated where three or more force thresholds are implemented using an input device and/or processing system. Furthermore, categorizing an input force as a low force or a high force by whether a respective force exceeds a high force threshold should not be intended as an actual description of the force magnitude of the respective force. The terminology between low forces and high forces is merely used to distinguish that one force threshold corresponds to a greater force value than the force value corresponding to a different force threshold.

Returning to FIG. 4, in one or more embodiments, exceeding a force threshold may trigger an activation event for one or more electronic system components. For example, an activation event may correspond to a "click" of a button that may cause an interface action to be performed by the electronic system. For example, the activation event may trigger a particular action to be performed within a graphical user interface on the display device. On the other hand, when a force estimate fails to exceed the force threshold, no activation event may be generated. Furthermore, an activation event may include a report to a host device regarding the force estimate, e.g., the amount of force detected in an input force or that the input force exceeds one or more force threshold.

In some embodiments, a force estimate detected using a bending response switches an input device from a doze mode or low-power mode to a high-power mode. For example, a processing system may notify a host device to exit a sleep mode in response to the force estimate exceeding one or more force thresholds. Likewise, in response to exiting the sleep mode, the host device may perform a finger print scan of an input object with less latency than if the input object was detected and identified before the host device wakes up. Moreover, by detecting a predetermined force value before performing a finger print scan, false activations by a finger print detector may be reduced while the input device is in one or more low power modes.

In some embodiments, a display device with proximity sensing capability but no force-sensing capability is converted into a force-sensitive display device using software operating on a processing system and/or host device, and without necessarily requiring separate and distinct force sensing components different from the proximity sensing components. For example, where no force sensors are specifically designed in a particular display device, a matrix electrode array in the display device may be configured to detect a force estimate by installing software on the processing system and/or the host device for analyzing the bending response. As such, force-sensitive user interface elements, such as buttons, may be implemented based on one or more force estimating technologies as discussed above.

Figure 7:
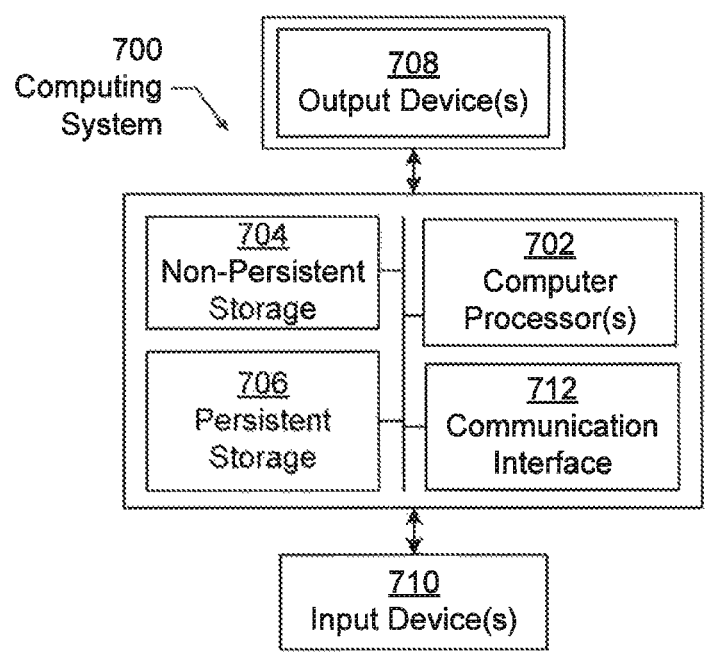
FIG. 7 shows a computing system in accordance with one or more embodiments.

Embodiments may be implemented on a computing system. Any combination of mobile, desktop, server, router, switch, embedded device, or other types of hardware may be used. For example, as shown in FIG. 7, the computing system (700) may include one or more computer processors (702), non-persistent storage (704) (e.g., volatile memory, such as random access memory (RAM), cache memory), persistent storage (706) (e.g., a hard disk, an optical drive such as a compact disk (CD) drive or digital versatile disk (DVD) drive, a flash memory, etc.), a communication interface (712) (e.g., Bluetooth interface, infrared interface, network interface, optical interface, etc.), and numerous other elements and functionalities.

The computer processor(s) (702) may be an integrated circuit for processing instructions. For example, the computer processor(s) may be one or more cores or micro-cores of a processor. The computing system (700) may also include one or more input devices (710), such as a touchscreen, keyboard, mouse, microphone, touchpad, electronic pen, or any other type of input device.

The communication interface (712) may include an integrated circuit for connecting the computing system (700) to a network (not shown) (e.g., a local area network (LAN), a wide area network (WAN) such as the Internet, mobile network, or any other type of network) and/or to another device, such as another computing device.

Further, the computing system (700) may include one or more output devices (708), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (702), non-persistent storage (704), and persistent storage (706). Many different types of computing systems exist, and the aforementioned input and output device(s) may take other forms.

Software instructions in the form of computer readable program code to perform embodiments of the disclosed technology may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the disclosed technology.

Shared memory refers to the allocation of virtual memory space to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the disclosed technology. The processes may be part of the same or different application and may execute on the same or different computing system.

Rather than or in addition to sharing data between processes, the computing system performing one or more embodiments of the disclosed technology may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the disclosed technology, may extract one or more data items from the obtained data. For example, the extraction may be performed as follows by the computing system (700) in FIG. 7. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 7, while performing one or more embodiments of the disclosed technology, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the disclosed technology, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (700) in FIG. 7 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The computing system (700) of FIG. 7 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system of FIG. 7. Other functions may be performed using one or more embodiments of the disclosed technology.

While the disclosed technology has been described with respect to a limited number of embodiments, those skilled in the art, having benefit of this disclosed technology, will appreciate that other embodiments can be devised which do not depart from the scope of the disclosed technology as disclosed herein. Accordingly, the scope of the disclosed technology should be limited only by the attached claims.

What is claimed is:
1. A processing system, comprising:
a sensor module, configured to:
perform a capacitive scan using a plurality of electrodes disposed in a display device in a first area; and
the processing system comprising electronically-readable instructions which when executed cause the processing system to:
determine a bending response of an input surface covering the first area and a second area different from the first area,
wherein the bending response, captured by the capacitive scan in the first area, results from an input force being applied to the input surface in the second area, the input force causing a defor- mation of the input surface that propagates from the second area to the first area, and determine, using the bending response, a force estimate of the input force, and determine, based on the force estimate, whether to perform an interface action.

2. The processing system of claim 1, wherein the electrodes are configured to update a graphical user interface (GUI) that is displayed in the first area.

3. The processing system of claim 1, wherein the electrodes comprise a plurality of common electrodes configured to perform display updating and capacitive sensing.

4. The processing system of claim 1, wherein the sensor module is further configured to transmit display control signals to the electrodes to update one or more display pixels in the display device.

5. The processing system of claim 1, wherein the sensor module is further configured to:
transmit one or more sensing signals to the electrodes, and
obtain at least one resulting signal from the electrodes; and
wherein the determination module is further configured to:
determine object information regarding one or more input objects in the first area using the at least one resulting signal.

6. The processing system of claim 1, wherein determining whether to perform the interface action comprises determining whether the force estimate exceeds a force threshold.

7. The processing system of claim 1, wherein determining the bending response comprises determining a shape of deformation that is produced by the input force within the input surface, and
wherein the force estimate is determined by comparing the determined shape of deformation to a deformation model.

8. The processing system of claim 1, further comprising a second sensor module disposed in the display device in the second area and configured to perform a second capacitive scan; and
wherein the determination module is further configured to determine, using the second capacitive scan, a touch response in the second area.

9. The processing system of claim 1, wherein the determination module is further configured to perform a fingerprint identification.

10. An electronic system, comprising:
a display device comprising a plurality of electrodes disposed in the display device in a first area;
an input surface covering the first area and a second area different from the first area; and
a processing system operatively connected to the display device, the processing system configured to:
perform a capacitive scan using the plurality of electrodes,
determine a bending response of the input surface,
wherein the bending response, captured by the capacitive scan in the first area, results from an input force being applied to the input surface in the second area, the input force causing a deformation of the input surface that propagates from the second area to the first area, and determine, using the bending response, a force estimate of the input force, and determine, based on the force estimate, whether to perform an interface action.

11. The electronic system of claim 10, wherein the processing system is further configured to:
transmit one or more sensing signals to the electrodes,
obtain at least one resulting signal from the electrodes, and
determine object information regarding one or more input objects in the first area using the at least one resulting signal.

12. The electronic system of claim 10, wherein the processing system is further configured to:
transmit display control signals to the electrodes to update one or more display pixels in the display device.

13. The electronic system of claim 10, wherein the processing system is further configured to:
report, to a host device, that the force estimate exceeds a force threshold,
wherein the host device is configured to perform the interface action within a graphical user interface displayed in the first area, based at least in part on the object information.

14. The electronic system of claim 10,
wherein determining the bending response comprises determining a shape of deformation that is produced by the input force within the input surface, and
wherein the force estimate is determined by comparing the determined shape of deformation to a deformation model.

15. The electronic system of claim 10, further comprising a second plurality of electrodes disposed in the display device in the second area; and wherein the processing system is further configured to:
perform a second capacitive scan using the second plurality of electrodes; and
determine, using the second capacitive scan, a touch response in the second area.

16. The electronic system of claim 10, wherein the processing system is further configured to perform a fingerprint identification.

17. A method, comprising:
performing a capacitive scan using a plurality of electrodes disposed in a display device in a first area;
determining a bending response of a display panel of the display device, the display panel spanning the first area and a second area different from the first area,
wherein the bending response, captured by the capacitive scan in the first area, results from an input force being applied to the display panel in the second area, the input force causing a deformation of the display panel that propagates from the second area to the first area; and
determining, using the bending response, a force estimate of the input force; and
determining, based on the force estimate, whether to perform an interface action.

18. The method of claim 17, further comprising:
capacitively sensing touch in the first area using the plurality of electrodes; and
determining object information regarding one or more input objects in the first area based on the capacitively sensed touch.

19. The method of claim 17, further comprising:
transmitting display control signals to the electrodes to update one or more display pixels of the display panel in the display device.

20. The method of claim 17, further comprising performing a fingerprint identification.

* * * * *